United States Patent
Mehra et al.

(10) Patent No.: US 10,990,288 B2
(45) Date of Patent: Apr. 27, 2021

(54) SYSTEMS AND/OR METHODS FOR LEVERAGING IN-MEMORY STORAGE IN CONNECTION WITH THE SHUFFLE PHASE OF MAPREDUCE

(71) Applicant: Software AG USA, Inc., Reston, VA (US)

(72) Inventors: Gagan Mehra, Oakland, CA (US); Manish Devgan, Herndon, VA (US)

(73) Assignee: SOFTWARE AG USA, INC., Reston, VA (US)

( * ) Notice: Subject to any disclaimer, the term of this patent is extended or adjusted under 35 U.S.C. 154(b) by 1667 days.

(21) Appl. No.: 14/449,517

(22) Filed: Aug. 1, 2014

(65) Prior Publication Data
US 2016/0034205 A1    Feb. 4, 2016

(51) Int. Cl.
*G06F 3/06* (2006.01)

(52) U.S. Cl.
CPC ........... *G06F 3/061* (2013.01); *G06F 3/0656* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 2010/0281078 A1* | 11/2010 | Wang | G06F 17/30445 707/812 |
| 2011/0154341 A1* | 6/2011 | Pueyo | G06F 9/5066 718/101 |
| 2011/0313844 A1* | 12/2011 | Chandramouli | G06Q 30/0241 705/14.42 |
| 2012/0222005 A1* | 8/2012 | Harris | G06F 9/45504 717/120 |
| 2012/0297145 A1* | 11/2012 | Castillo | G06F 12/0868 711/138 |

(Continued)

OTHER PUBLICATIONS

In-Memory Accelerator for Hadoop 1.1—White Paper, GridGain Systems 2013, pp. 1-16.

(Continued)

*Primary Examiner* — Kris E Mackes
*Assistant Examiner* — Soheila (Gina) Davanlou
(74) *Attorney, Agent, or Firm* — Nixon & Vanderhye P.C.

(57) ABSTRACT

Certain example embodiments relate to a computer system for performing a map reduce sequence. Nodes therein include at least one processor and memory and are divided into at least mapper and reducer nodes. Each mapper node executes a map function on input to generate intermediate output elements. Each said intermediate output element includes a first key-value pair. Each element key includes associated map and reduce task identifiers. Each element value includes substantive data, organized as another key-value pair. The intermediate output elements are stored to memory. Each reducer node: retrieves at least intermediate output element values from the memory of a given mapper node, using specified map and reduce task identifiers; stores the retrieved element values to its memory; executes a reduce function on the retrieved element values, in order; and outputs a result from the reduce function for the map reduce sequence. Disk operations advantageously are reduced or eliminated.

25 Claims, 7 Drawing Sheets

(56) References Cited

U.S. PATENT DOCUMENTS

| | | | |
|---|---|---|---|
| 2012/0317579 A1* | 12/2012 | Liu | G06F 9/5072 |
| | | | 718/104 |
| 2013/0318277 A1* | 11/2013 | Dalal | G06F 13/1652 |
| | | | 710/308 |
| 2013/0345999 A1* | 12/2013 | Hafen | G01R 21/133 |
| | | | 702/60 |
| 2014/0059552 A1* | 2/2014 | Cunningham | G09G 5/00 |
| | | | 718/102 |

OTHER PUBLICATIONS

David L. Brinker et al., "Accelerating Hadoop MapReduce Using an In-Memory Data Grid," 2013 ScaleOut Software, Inc., pp. 1-9.

* cited by examiner

SYSTEMS AND/OR METHODS FOR LEVERAGING IN-MEMORY STORAGE IN CONNECTION WITH THE SHUFFLE PHASE OF MAPREDUCE

TECHNICAL FIELD

Certain example embodiments described herein relate to improvements that may be made in processing large volumes of data. More particularly, certain example embodiments described herein relate to techniques for using a large amount of in-memory storage during the shuffle phase of MapReduce.

BACKGROUND AND SUMMARY OF EXAMPLE EMBODIMENTS

There are a number of tools that have recently emerged for storage and large-scale processing of data sets, e.g., on clusters of commodity hardware. The Apache Hadoop framework, for example, seems to have become the de facto standard for processing big data sets. One element of the Hadoop Framework is the Hadoop Distributed File System (HDFS), which is a distributed file system that stores data on commodity machines, providing very high aggregate bandwidth across the cluster. Another element of the Hadoop Framework is the YARN (Yet Another Resource Negotiator) platform, which is a resource-management platform responsible for managing computer resources in clusters and using them for scheduling of users' applications. The YARN programming paradigm, in turn, supports several different programming models.

One popular programming model for large scale data processing that works with the HDFS and YARN in the context of the Hadoop Framework is MapReduce, which has been used extensively since Hadoop's first release and currently is very popular. MapReduce enables the processing of vast amounts of data (e.g., multi-terabyte data sets) in-parallel on large clusters (e.g., thousands of nodes) of commodity hardware in a reliable, fault-tolerant manner. As shown schematically in the FIG. 1 block diagram, MapReduce can be broken down into three high-level phases, namely, map, shuffle, and reduce.

The map phase applies the map function to all input. Mappers, whose task it is to process the blocks in the input file that are stored locally on the computer, are launched on all computers in the cluster. In other words, computations take place where the data is stored, providing a sort of data locality. Because no dependencies exist between the various mappers, they can work in parallel and independently of one another. If a computer in the cluster fails, the last or not yet computed map results can be re-calculated on another computer that possesses a replica of the corresponding block.

A mapper may process the contents of a block line-by-line, interpreting each line as a key-value pair. The actual map function is called individually for each of these pairs and creates an arbitrarily large list of new key-value pairs from it. In general, this map be represented as: map (key, value)→List (key', value').

Figure 1:
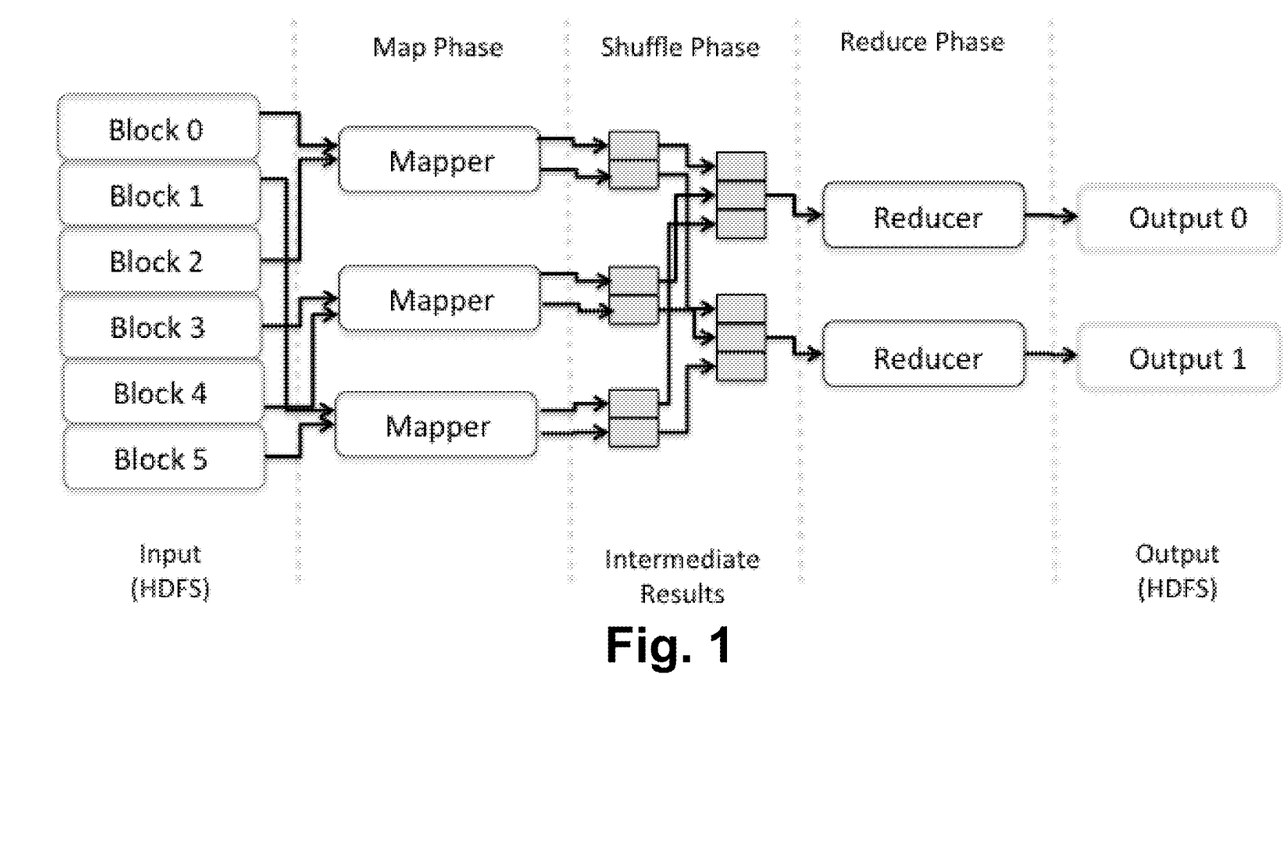
FIG. 1 is a block diagram illustrating the three high-level phases of MapReduce.

As will be appreciated from FIG. 1, MapReduce uses a shuffle-and-sort process to make the output from the mappers ready for consumption by the reducers. The shuffle phase sorts the resulting pairs from the map phase locally by using their keys, after which MapReduce assigns them to a reducer according to their keys. The framework helps ensure that all pairs with the same key are assigned to the same reducer.

Because the output from the map phase can be distributed arbitrarily across the cluster, the output from the map phase needs to be transferred across the network to the correct reducers in the shuffle phase. And because of the large volumes of data oftentimes handled by a typical system implementing the Hadoop framework, it is normal for correspondingly large volumes of data to cross the network in such operations, e.g., to ensure that the output from the map phase is processed and organized for the reducers.

Figure 2:
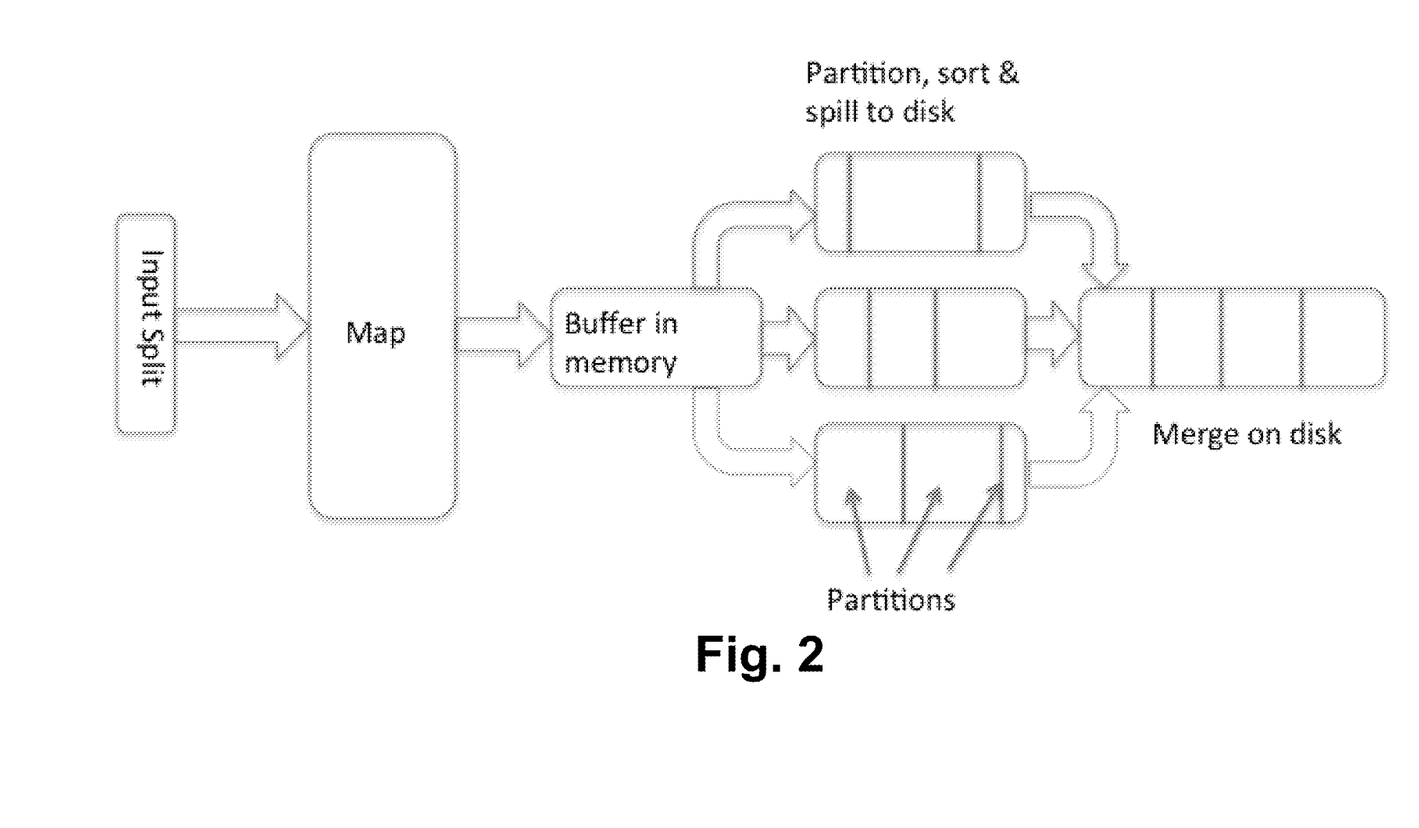
FIG. 2 is a block diagram illustrating the creation, sorting, and merging on disk of multiple spill files, as associated with the operation of a typical shuffle phase.

The output from the map phase therefore triggers data processing in the shuffle phase that ends up using memory buffers, which are limited by the available RAM. If the buffers run out of memory, the shuffle phase starts using disk for "spills." The more spill files created, the more effort is required later to merge them into a single file for consumption by their respective reducers. In this regard, FIG. 2 is a block diagram illustrating the creation, sorting, and merging on disk of multiple spill files, as associated with the operation of a typical shuffle phase.

In the reduce phase, the reducer collates all the pairs with the same key and creates a sorted list from the values. The key and the sorted list of values provides the input for the reduce function.

The reduce function typically compresses the list of values to create a shorter list, for example, by aggregating the values. The reduce function oftentimes returns a single value as its output. Generally speaking, the reduce function creates an arbitrarily large list of key-value pairs, just like the map function: reduce (key, List (values))→List(key', value').

The output from the reduce phase can, if needed, be used as the input for another map-reduce iteration. Alternatively, this data might be considered "final," and processing may proceed accordingly.

Based on the description above, it will be appreciated that the shuffle phase could be improved, at least from a performance perspective. For instance, the inventors have recognized that it would be desirable to address the need for the shuffle-and-sort process to go to multiple nodes to process multiple spill files and organize the data for the reducers, e.g., when large data volumes are processed and create these multiple spill files.

Some attempts to improve MapReduce performance have focused on changing all of its phases so that they use a shared in-memory instance. However, because the focus has been on sharing data between jobs to make them run faster, they have not focused on tuning the oftentimes problematic shuffle phase, in particular. This generally unfocused approach implies that depending on the data needs of a specific job, the deployment may or may not see a significant improvement in the processing speed. In fact, some such in-memory approaches have relied on the heap available within the Java Virtual Machine (JVM), thereby increasing the possibility of being negatively impacted by frequent garbage collection pauses.

Other approaches have tried in the same generally unfocused manner to use memory instead of disk to leverage benefits based on input/output (I/O) speed differences between these storage tiers. Unfortunately, however, network latency can have a significant impact, as the shared memory cluster may be susceptible to network traffic and network congestion issues.

Thus, it will be appreciated that it would be desirable to enhance the performance of MapReduce, e.g., in a manner that focuses on realizing improvements in the most expensive phase thereof.

Certain example embodiments help overcome the challenges posed by the creation of multiple spill files and the need for the shuffle-and-sort process to go to multiple nodes to process the spill files. In this regard, certain example embodiments help organize the data for the reducers by moving the processing to memory, thereby advantageously resulting in almost real-time shuffle-and-sort in some cases. For instance, certain example embodiments focus on making the shuffle phase faster by reducing the number of spill files written to disk by making available to the shuffle phase terabytes of memory. For instance, certain example embodiments seek to generate as few spill files as possible which, in some instances, will amount to zero or only one spill file(s). The in-memory solution of certain example embodiments may leverage off-heap memory, e.g., that advantageously is not impacted by the known issues with the Java garbage collector. It will be appreciated that off-heap memory in this context refers to low-latency volatile storage that exists outside of the Java heap and thus is not subject to garbage collection.

One aspect of certain example embodiments relates to techniques for using a large amount of in-memory storage during the shuffle phase of MapReduce. An in-memory data grid (IMDG), which is a data structure that resides entirely in RAM and may be distributed among multiple nodes or servers, may be used for this purpose in certain example embodiments.

Another aspect of certain example embodiments relates to the creation of fewer spill files (and possibly zero or only one spill file) during the shuffle phase of MapReduce, thereby reducing (and possibly even eliminating) the need to merge partitions.

Another aspect of certain example embodiments relates to the use of a descriptor similar to the descriptor structures already provided by MapReduce to speed up the in-memory shuffle phase. For instance, in certain example embodiments, mapper functions that ordinarily generate key-value pairs as substantive output may generate composite structures in which this substantive key-value pair output is treated as the value in a larger key-value pair. The key to the larger key-value pair itself may be a composite, identifying both a specific map task and a reduce task.

In certain example embodiments, a method of performing a map reduce sequence in connection with a plurality of computer nodes in a distributed network system is provided. Each said node includes at least one processor and a transitory computer readable storage medium. The nodes are divided into at least mapper nodes and reducer nodes. At each said mapper node, a map function is executed on input using the at least one processor of the respective mapper node to generate intermediate output elements. Each said intermediate output element includes a first key-value pair. Each intermediate output element key includes an associated map task identifier and an associated reduce task identifier. Each intermediate output element value includes substantive data generated from the input by the map function. The intermediate output elements are stored to the transitory computer readable storage medium of the respective mapper node. Each said reducer node is configured to, upon receipt of electronic instructions: retrieve at least intermediate output element values from the transitory computer readable storage media of a given mapper node, based on map task and reduce task identifiers specified by the electronic instructions, store the retrieved intermediate output element values to the transitory computer readable storage medium of the respective reducer node, execute a reduce function, using the at least one processor of the respective reducer node, on the retrieved intermediate output element values, in order, and output a result from the reduce function for the map reduce sequence.

In certain example embodiments, a method of performing a map reduce sequence in connection with a plurality of computer nodes in a distributed network system is provided. Each said node includes at least one processor and both transitory and non-transitory computer readable storage media. The nodes are divided into at least mapper nodes and reducer nodes. The method includes, at each said mapper node: executing, using the at least one processor of the respective mapper node, a map function on input to generate intermediate output elements, each said intermediate output element including a first key-value pair, each intermediate output element key including an associated map task identifier and an associated reduce task identifier, and each intermediate output element value including substantive data generated from the input by the map function, wherein the substantive data of each intermediate output element is organized as a second key-value pair; storing the intermediate output elements to the transitory computer readable storage medium of the respective mapper node; holding the intermediate output elements in memory of the respective mapper node; and preventing the intermediate output elements from spilling to the non-transitory computer readable storage media of the respective mapper node (e.g., to the maximum extent possible).

In certain example embodiments, a method of performing a map reduce sequence in connection with a plurality of computer nodes in a distributed network system is provided. Each said node includes at least one processor and both transitory and non-transitory computer readable storage media. The nodes are divided into at least mapper nodes and reducer nodes. The method comprises, at each said reducer node: retrieving at least intermediate output element values from the transitory computer readable storage media of a given mapper node, based on map task and reduce task identifiers specified by electronic instructions received at the respective reducer node; storing the retrieved intermediate output element values to the transitory computer readable storage medium of the respective reducer node; ordering the retrieved intermediate output element values; executing a reduce function, using the at least one processor of the respective reducer node, on the retrieved and ordered intermediate output element values; and outputting a result from the reduce function as part of the map reduce sequence. Each said intermediate output element includes a first key-value pair, each intermediate output element key includes an associated map task identifier and an associated reduce task identifier, and each intermediate output element value includes substantive data that is generated by a map reduce function and organized as a second key-value pair.

In certain example embodiments, a computer system configured to perform a map reduce sequence is provided. The system includes a plurality of computer nodes, with each said node including at least one processor and a transitory computer readable storage medium. The nodes are divided into at least mapper nodes and reducer nodes. Each said mapper node is configured to: execute, using the at least one processor of the respective mapper node, a map function on input to generate intermediate output elements, each said intermediate output element including a first key-value pair, each intermediate output element key including an associated map task identifier and an associated reduce task identifier, and each intermediate output element value including substantive data generated from the input by the map function; and store the intermediate output elements to the transitory computer readable storage medium of the respective mapper node. Each said reducer node is configured to, upon receipt of electronic instructions: retrieve at least intermediate output element values from the transitory computer readable storage media of a given mapper node, based on map task and reduce task identifiers specified by the electronic instructions; store the retrieved intermediate output element values to the transitory computer readable storage medium of the respective reducer node; execute a reduce function, using the at least one processor of the respective reducer node, on the retrieved intermediate output element values, in order, and output a result from the reduce function for the map reduce sequence.

Non-transitory computer readable storage mediums tangibly storing instructions for performing the above-summarized and/or other approaches also are provided by certain example embodiments, as well as corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS

Certain example embodiments help improve the performance of the MapReduce algorithm, which oftentimes is used to help process large data sets. As indicated above, although MapReduce can handle very large data sets quite well, its specific phases are still susceptible to performance problems of and/or in the environment, for example, with respect to file input/output (I/O) operations undertaken for intermediate storage and/or the like. In this regard, certain example embodiments described herein relate to techniques for leveraging in-memory storage in connection with the shuffle phase of MapReduce. By making more memory available (e.g., via an in-memory data grid (IMDG) or the like), certain example embodiments result in the generation of fewer spill files (and possibly even zero or only one spill file(s)), advantageously reducing the time required to write to disk, spent sorting multiple spill files based on partitions, merging files, and involved in allowing mapped jobs to finish. The focus on the shuffle phase is advantageous, as this is where much of the slow-down in the MapReduce process is caused.

According to certain example embodiments, descriptors similar to the descriptor structures defined by the MapReduce algorithm itself include metadata information about the task identifier (process) and the storage location (which in some cases may be a filename or the like). Example implementations that make use of such descriptors are elegant in the sense that they make only minor modifications to MapReduce, and open up new avenues for controlling and communicating with an IMDG server. Certain example embodiments thus add speed and reduce the complexity in implementing such an in-memory solution.

Figure 3:
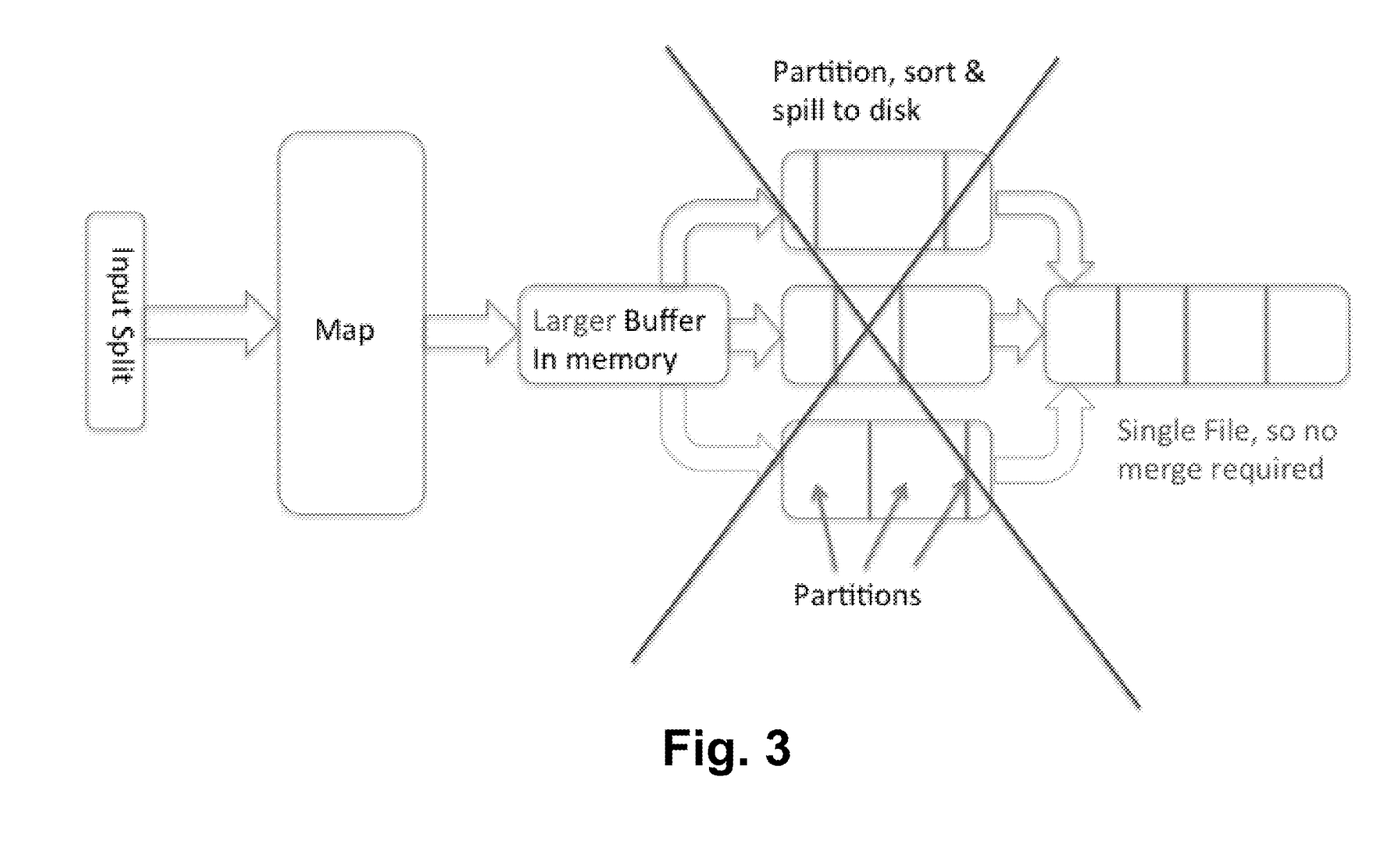
FIG. 3 is a marked-up version of the FIG. 2 diagram that shows changes implemented by certain example embodiments.

At a higher-level perspective, FIG. 3 is a marked-up version of the FIG. 2 diagram that shows changes implemented by certain example embodiments. As can be seen from FIG. 3, certain example embodiments involve having each mapper running on a node writing its output to local memory. To enable the mappers' output to fit into memory on the respective nodes, either sufficient RAM needs to be available on the particular node, or the map job needs to be further broken down so that the output is smaller and can fit into the available RAM. As also can be seen from FIG. 3, larger in-memory storage is provided, thereby prompting the generation of a single output file in this example instance and in turn obviating the need for merging.

In somewhat greater detail, certain example embodiments involve shuffle phase data processing in connection with a large memory buffer, thereby facilitating in-memory processing of the data and metadata to an increased extent (e.g., as greatly as possible), while also attempting to avoid writing spill files to disk (e.g., to the greatest extent possible). Certain example embodiments also attempt to reduce the likelihood of map jobs being blocked because of a full memory buffer, as the map outputs block in the current environment if the buffer gets filled. That is, each map job ordinarily might be configured to start writing to a spill file once the buffer reaches a certain utilization percentage (e.g., 80% full), and a separate thread might perform this activity so that before the buffer reaches 100% utilization, the spill file can be created and the mapper can continue to write to it. Of course, while the spill file is being created, it is possible for the mapper to use the remaining 20% of the buffer, resulting in the mapper being blocked until the spill file is created. Having a larger memory buffer helps avoids this problem, as 80% of a larger buffer will take longer to fill and also 20% of a larger buffer will give more time to create the spill file, if one is needed at all. These modifications in turn help reduce the likelihood of the partition and sort steps occurring (and sometimes completely prevent them), as the spill to disk is performed a reduced number of times (and possibly never). Even if there is one spill file created, no merge is required, which still results in time savings.

EXAMPLE IMPLEMENTATION

Certain example embodiments involve a computer system with a group of clustered computer nodes. The cluster may be a Hadoop cluster configured to run a modified Hadoop implementation of MapReduce, e.g., using Hadoop nodes. As will be appreciated by those skilled in the art, other cluster and node arrangements and/or MapReduce or similar algorithms may be provided. Each said node may include its own processor, memory, and in-memory solution. The in-memory solution of certain example embodiments may enable use of off-heap memory as a part of the shuffle phase of MapReduce. It will be appreciated that performance tuning, optimizations, and the like may be performed in dependence on, for example, a specific use case. Such improvements may involve, for example, improvements that take into account memory use, the performance of the jobs, and/or the like, but nonetheless may involve little effort in adapting existing Hadoop implementations to take advantage of the example techniques set forth herein. In this regard, benefits might include, for example, saving time in making decisions as the jobs are able to product results faster, the ability to increase accuracy by processing larger volumes of data in the same time, enabling real-time or near real-time interaction with other downstream applications like e-commerce or business intelligence applications or the like, etc.

Figure 4:
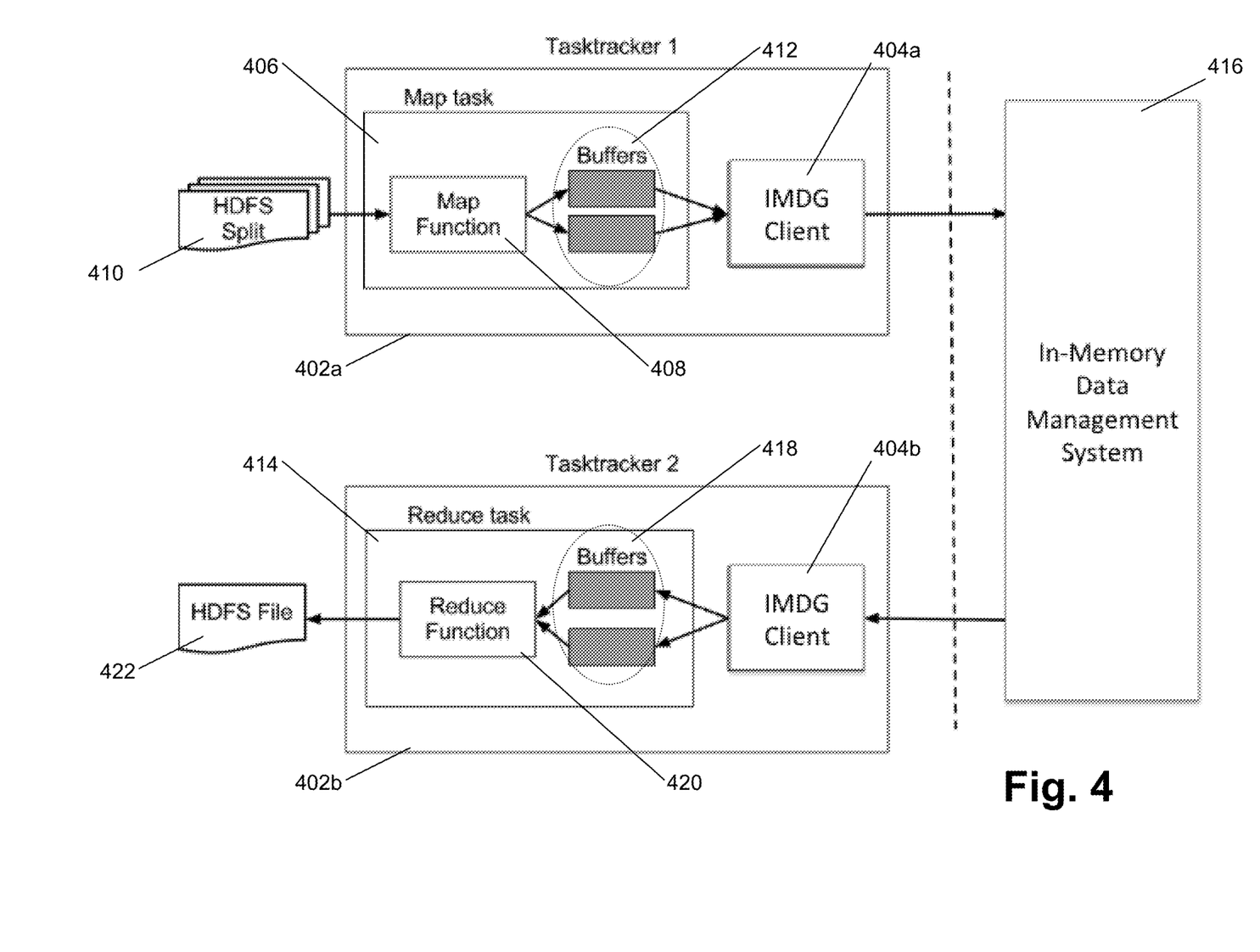
FIG. 4 is a block diagram showing a simplified Hadoop cluster configuration in accordance with certain example embodiments.

FIG. 4 is a block diagram showing a simplified Hadoop cluster configuration in accordance with certain example embodiments. First and second TaskTracker daemons 402a-402b run on respective physical nodes. In Hadoop, a TaskTracker is a node in the cluster that accepts tasks (e.g., map, reduce, and shuffle operations) based on a number of slots assigned thereto from a JobTracker. The JobTracker is the service within Hadoop that farms out MapReduce tasks to specific nodes in the cluster. A TaskTracker may spawn separate Java Virtual Machine (JVM) processes to do the actual work assigned to it. The TaskTracker monitors the spawned processes, capturing the output and exit codes, etc., and reporting back to the JobTracker when the process finishes, with information about empty processing slots/processing availability, with "alive" messages, etc. In FIG. 4, each TaskTracker 402a-402b has an in-memory data grid (IMDG) client 404a-404b, that is used by map and reduce tasks forked to the corresponding node.

A typical MapReduce flow will now be described in connection with FIG. 4. First, with respect to the map phase, TaskTracker 1 402a runs a map task 406 that reads the input splits from the Hadoop Distributed File System (HDFS), and applies the user supplied map function 408 on each received split 410. The intermediate outputs in the form of serialized key-value pairs are written out to the in-memory buffer 412. This normally would involve spill-overs to the disk that is indexed by the Map Task ID for consumption by the reducers. Instead of this normal flow, however, the map task 406 according to certain example embodiments instead writes its output to the IMDG client 404a. The IMDG client 404a in certain example implementations can hold terabytes of data (e.g., data up to 10 s or 100 s of terabytes) in memory, thereby helping to ensure that the buffer does not run out of memory. The element's key may be a composite, e.g., including the Map Task ID and the Reduce Task ID. The element's value may include the actual key-value pair emitted by the map task 406. (both are serializable). The key and the value outputted by the mapper (and/or the components thereof such as, for example, the Map Task ID and Reduce Task ID) may be serializable in the sense that may be objects that can be stored and retrieved later to reconstruct the objects. The key-value pair from the map task 406 may be used by the shuffle-and-sort process to make it easier for each reducer to consume the data. By introducing the element concept, which optionally uses a composite of the Map Task ID and the Reduce Task ID as indicated above, the process can be simplified. Further implementation details are provided below.

With respect to the shuffle phase, the TaskTracker 1 402a informs the cluster's JobTracker daemon that the map task 406 has finished, which triggers a reduce task 414 being spawned on TaskTracker 2 402b. The JobTracker supplies the reduce task 414 running on TaskTracker 2 402b with TaskTracker 1's identity (e.g., an IP address or the like), and the original Map Task ID. This normally would involve the reduce task fetching the key-value pairs from TaskTracker 1 using an HTTP GET request, which would be served by a small web server, and would cause the serialized key-value pairs to be read from disk (which is an expensive operation) and be sent to TaskTracker 2. In certain example embodiments, however, TaskTracker 2 402b simply builds a composite key and fetches the Value object that includes the actual key-value pair emitted by the map task 406. Consistent with the example above, the composite key is defined as K=MapTask ID+Reduce Task ID. The IMDG.get(K) method may be executed to fetch the value object, e.g., from the IMDG client 404a running on TaskTracker 1 402a via the IMDG server 416 such that it is made accessible to the local IMDG client 404b on TaskTracker 2 402b. This functionality may be implemented by any suitable means such as, for example, by executing an Application Programming Interface (API) call, a web service call, an HTTP GET request, etc. It will be appreciated that the IMDG clients may sync up data with the IMDG system. In this case, the client 404a syncs up the mapper output to the IMDG system so that when the reduce function 420 queries 404b, it is able to retrieve the needed information from the IMDG system.

To facilitate the transfer of data from TaskTracker 1 402a to TaskTracker 2 402b, data maintained in the IMDG client 404a on TaskTracker 1 402a may be replicated to the IMDG server 416. This replication approach can make the overall configuration more fault tolerant. For instance, if one mapper node goes down, does not respond, or encounters some other fault condition, the IMDG server 416 may still be consulted to retrieve the needed data. In other words, the output from the mapper will still be available on the IMDG server 416 side, and the reducers will be able to access it without re-running the mapper jobs.

With respect to the sort phase, the sequence of operations may be the same or similar, regardless of whether there is an IMDG server 416 present. In this regard, the fetched key-value pairs retrieved using an HTTP GET request or an IMDG.get( )method may be retrieved and made accessible to the IMDG client 404b so that they can be stored in the local buffer 418 on TaskTracker 2 402b. The IMDG client 404b and buffer 418 may be shared by all reduce tasks 414 spawned on TaskTracker 2 402b. The buffer 418 may emptied to the disk periodically or as needed (e.g., when the reduce task has finished consuming the data from the buffer). When all records are available, they may be merge-sorted or the like and supplied to the reduce function 414 in sorted order.

As an example, the key for an element might take the following example form:
task_201406181733_0003_m_000005task_2014061817-33_0002_r_000001
where the first part is the Map Task ID and the second part is the Reduce Task ID. To sort these elements for processing by the reduce task 414, the sorting may be done on the Reduce Task ID. In this example, the sorting will use "0002_r" to align all the outputs (which are stored in the element values) from different mappers for processing by the reducer. It will be appreciated that this sorting may be performed in memory without shuffling data around on disk, thereby making such operations very fast and allowing a specific reducer to select all of the values that it needs to process very quickly.

Another example of an element key is:
task_201406241207_0015_m_000006task_20140624 12-
07_0008_r_000003
This element key represents the sixth map task in the fifteenth job running at the jobtracker started at 201406241207. It is ready for consumption by the third reducer task in the eight job.

Further implementation details regarding the shuffle-and-sort process will now be provided in connection with an example that involves counting words, e.g., to help demonstrate how the element keys work. Consider the following two sentences: "Great inventions create great companies" and "Some people are born great, some achieve greatness and some have greatness thrust upon them". Assuming, for the purposes of this example, that these sentences are processed by two map jobs, then the Map Task IDs for these might be represented as follows:

task_201406181822_0001_m_000001
task_201406181822_0002_m_000001

For Mapper 1, the substantive output may be represented in a key-value format like: <great,1>, <inventions,1>, <create,1>, <great,1>, <companies,1>. For Mapper 2, assuming that the same key-value format is used, the output will be: <some,1>, <people,1>, <are,1>, <born,1>, <great,1>, <some,1>, <achieve,1>, <greatness,1>,<and,1>, <some,1>, <have,1>, <greatness,1>, <thrust,1>, <upon,1>, <them,1>.

Assuming further for the purposes of this example that there are two reducers that are used to process the output from the mappers, the Reduce Task IDs might be represented as follows:

task_201406181822_0001_r_000001
task_201406181822_0002_r_000001

This output, instead of being written to disk, may be written to the local IMDG by using an IMDG writable class or the like. The IMDG stores the output using element keys, and the element key for the first mapper will be:
task_201406181822_0001_m_000001task_2014061818-
22_0001_r_00000
It will be appreciated that the element values are the key-value pairs emitted by the first mapper.

The first reducer can then search for all keys that match "0001_r" to process the output from the mappers directly from the IMDG. The key-value pairs coming out of the two mappers will be split across the two reducers for processing. After the sort operation is done in-memory, the reducer will process the values. For instance, for the word "great", the input to the reducer may be <great, {1,1,1}>. After processing this input, the reducer can directly write the output to the IMDG by using the IMDG output writable class or the like. In this case, the output will be <great,3>.

Figure 5:
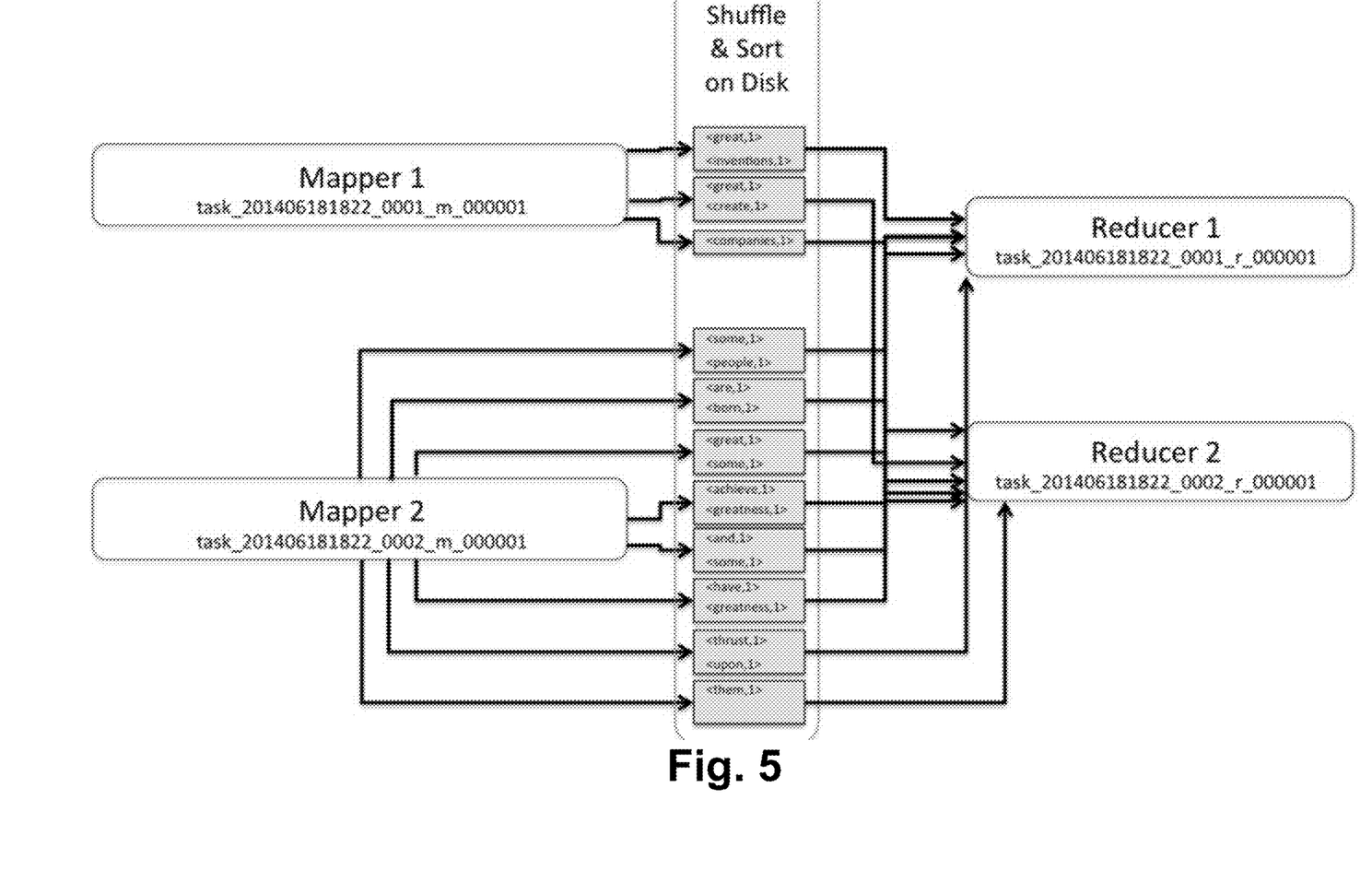
FIG. 5 is a diagram that illustrates the shuffle-and-sort process from a conventional MapReduce perspective when applied to an illustrative word count scenario.

FIG. 5 is a diagram that illustrates the shuffle-and-sort process from a conventional MapReduce perspective when applied to this word count scenario. As will be appreciated from FIG. 5, the mappers write to disk, and the shuffle-and-sort process arranges the output for consumption by the reducers. The process is cumbersome, takes a long time (e.g., because of repeated disk operations), and is not fault tolerant.

Figure 6:
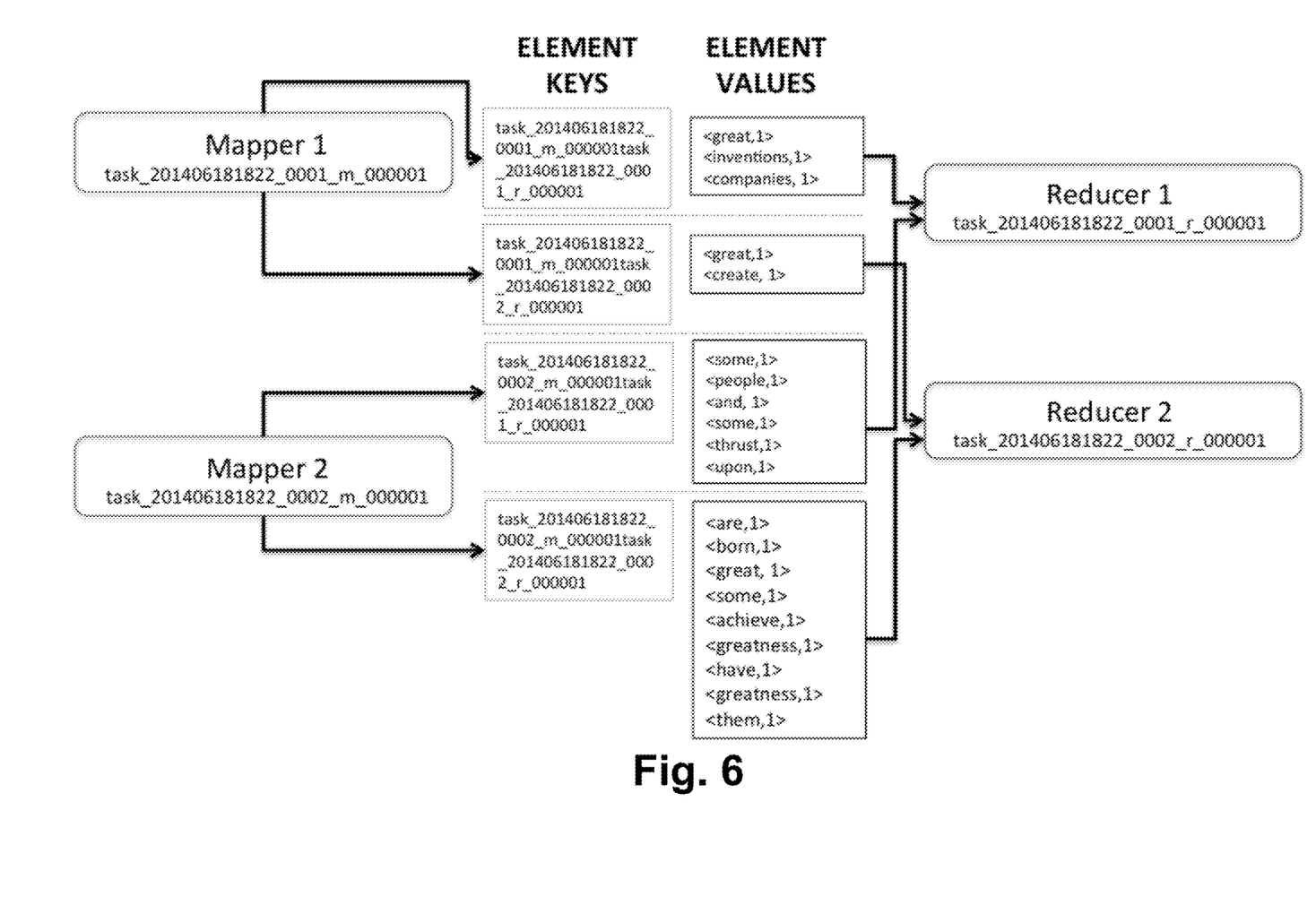
FIG. 6 is a diagram that illustrates the shuffle-and-sort process of certain example embodiments when applied to the word count scenario of FIG. 5.

By contrast, FIG. 6 is a diagram that illustrates the shuffle-and-sort process of certain example embodiments when applied to this word count scenario. As will be appreciated from FIG. 6, certain example embodiments enable the shuffle-and-sort process to run faster by having the mappers directly write their output to memory (e.g., the IMDG). The output is arranged into different buckets by using element keys, and this approach makes it easier to sort for consumption by the reducers.

It will be appreciated that the FIG. 6 example approach is advantageous in that it reduces, and sometimes even eliminates, disk I/O operations associated with at least shuffle-and-sort process operations, e.g., as outputs are written directly to memory by the mappers. Because the values are in essence "self-organizing" by virtue of the element keys, the shuffle-and-sort process may be faster. And at the reduce phase, these elements can be read from memory, which will be faster to access than disk. The overall approach thus can greatly improve the MapReduce process. Moreover, it will be appreciated that it is easy to adapt existing MapReduce jobs to make use of the IMDG and run the full shuffle-and-sort process in memory, e.g., by virtue of element re-definition of the type set forth herein.

Referring once again to FIG. 4, it will be appreciated that the reduce phase may operate with the same or similar sequence of operations, regardless of whether an IMDG is present. For instance, the reduce task 414 in FIG. 4 iterates over the value set for each key, applies the user supplied reducer function 420 on them, and writes them out to the HDFS in one or more suitable HDFS files 422 or the like. The output may be fed back into MapReduce for further processing, as required.

Although FIG. 4 includes two nodes, with one mapper and one reducer, it will be appreciated that other implementations may include more nodes with such nodes performing different tasks as appropriate for the particular use case. It also will be appreciated that multiple tasks may be started on a given node. In this regard, a node may start as a mapper and become a reducer, depending on when it finishes its tasks relative to other nodes in the cluster and based upon instructions from the JobTracker.

Certain example embodiments enable Hadoop and IMDG clusters to coexist seamlessly, e.g., as certain example implementations may run IMDG client and/or server processes on the same machines running Hadoop daemons. Moreover, certain example embodiments may help improve the performance of custom MapReduce jobs, as well as those jobs forked to nodes by other services such as, for example, Hive (which supports analysis of large datasets stored in Hadoop's HDFS and compatible file systems via a querying language), Pig (which is a high-level platform for creating MapReduce programs used with Hadoop), HBase (which is a distributed, scalable, Big Data store that in some instances is implemented as a column-oriented database management system that runs on top of HDFS), and/or the like. It thus will be appreciated that Hadoop-related products (e.g., those products that sit on top of Hadoop) may benefit if the jobs run faster because of in-memory data processing and if these technologies can directly read data from memory.

Figure 7:
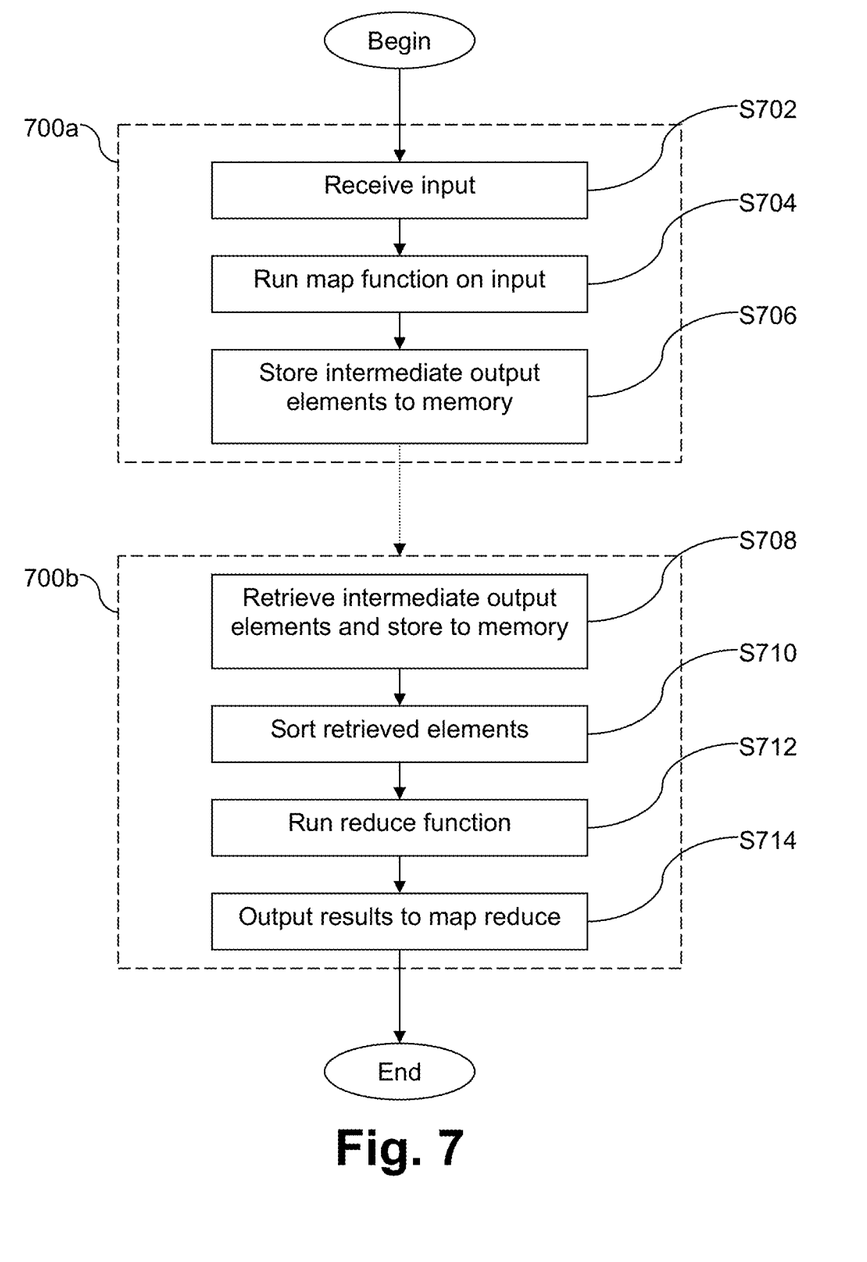
FIG. 7 is a flowchart showing a simplified map reduce sequence in accordance with certain example embodiments.

FIG. 7 is a flowchart showing a simplified map reduce sequence in accordance with certain example embodiments. The operations that are performed in box 700a may be performed by any suitable number of mapper nodes, and the operations that are performed in box 700b may be performed by any suitable number of reducer nodes. It will be appreciated that there need not be a one-to-one relationship as between mapper and reducer nodes. In step S702, each mapper node receives input. A map function is executed on this input in step S704, which generates intermediate output elements. Each intermediate output element includes a first key-value pair. Each intermediate output element key includes an associated map task identifier and an associated reduce task identifier. Each intermediate output element value includes substantive data generated from the input by the map function. This substantive data may be organized as a second key-value pair that, in essence, is embedded in the element's key-value pair. The map and reduce task identifiers may be serialized, as may be the keys for the intermediate output elements. The map and reduce task identifiers may be serialized, as may be the keys for the intermediate output elements.

In step S706, the intermediate output elements are stored to the transitory computer readable storage medium of the respective mapper node. The transitory computer readable storage medium may be memory (e.g., off-heap memory), managed by an IMDG client or the like, etc. In certain example embodiments, data may be mirrored to an IMDG server, e.g., for fault-tolerance purposes and/or the like. In this regard, certain example embodiments involving the mapper nodes holding the intermediate output elements in memory of the mapper nodes on which they reside, and preventing the intermediate output elements from spilling to non-transitory computer readable storage media (e.g., to the maximum extent possible). More particularly, in certain example embodiments, the preventing may work if sufficient memory is provided to the IMDG for storing the mapper outputs, and the prevention may be impacted by the available RAM in the node or node cluster. In this regard, if sufficient memory is not available, then spill files will be created to a reduced extent but still in dependence on the size of the mapper output. As an example, if a node has 100 GB of RAM and the mapper output is 250 GB, then there might be two spill files created with additional data remaining in memory. But because certain example embodiments may implement an IMDG with a nearly (or at least practically) unlimited heap of storage, it advantageously becomes possible to reduce and sometimes completely prevent any kind of spill-out condition.

Upon receipt of electronic instructions, each reducer node is configured to retrieve (and store to its transitory computer readable storage medium) at least intermediate output element values from the transitory computer readable storage media of a given mapper node in step S708. The retrieval is facilitated using map task and reduce task identifiers specified by the electronic instructions that, in essence, help index directly to the key of the element. If the element values cannot be retrieved from the given node for some reason, the reducer node may attempt to retrieve it from the IMDG server, if available. For instance, if the values are not in the IMDG client, they may be retrieved from the IMDG server. In step S710, the retrieved intermediate output element values sorted, e.g., while they remain in the transitory computer readable storage medium of the respective reducer node. Merge sorts may be efficient in this regard. In step S712, a reduce function is executed on the now-sorted retrieved intermediate output element values, and a result from the reduce function is outputted in step S714, for the map reduce sequence to take further action as needed. It thus will be appreciated that shuffle and sort map reduce operations are performed on reducer nodes in a very efficient and low-disk intensive (or no-disk) manner.

In order to deploy certain example embodiments, it might be advantageous in some cases to prototype the Hadoop clustered IMDG by working on the code (e.g., modifying or adjusting the existing code and adding IMDG behavior as explained herein) of Hadoop's MapTask, TaskTracker, ReduceTask, and possibly other associated classes, e.g., to make use of the IMDG rather than disk. Unit tests may be performed for functionality testing. In some cases, the changes needed may be minor, as it might be possible to modify only the IMDGOutputFormat class in making the mappers work, while modifying only the IMDGInputFormat class in making the reducers work. Performance testing may be conducted using services like WordCount, TeraSort, etc., e.g., to benchmark the performance results against standard implementations and demonstrate the benefits of the IMDG and descriptor scheme discussed herein. As will be appreciated, an IMDG may refer to an arrangement in which all servers can be active in each site, all data is stored in the RAM of the servers, servers can be added or removed non-disruptively (e.g., to increase the amount of RAM available), the data model is non-relational and is object-based, distributed applications (e.g., written on the .NET and Java application platforms) are supported, and the data fabric is resilient (e.g., allowing non-disruptive automated detection and recovery of a single server or multiple servers). Of course, additional and/or alternative IMDG functionality may be provided in certain example embodiments.

Although certain example embodiments have been described in connection with Hadoop, including Hadoop's implementation of MapReduce, the HDFS, etc., it will be appreciated that the example techniques disclosed herein may be used in connection with other frameworks, MapReduce algorithm implementations, distributed file systems, and/or the like. Similarly, although certain example embodiments are described in connection with an IMDG, it will be appreciated that other types of memory managers (e.g., off-heap memory managers) that reduce the likelihood of disk spills from occurring may be used in different implementations. Terracotta's Big Memory product may be used in this regard. See, for example, U.S. Publication No. 2012/0222005, the entire contents of which are hereby incorporated herein by reference.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of performing a map reduce sequence in connection with a plurality of computer nodes in a distributed network system, each of the plurality of computer nodes including at least one hardware processor, the distributed network system including volatile storage, the method comprising:

executing, on multiple ones of the plurality of computer nodes, a map job, as part of the map reduce sequence, by using input data to generate, from each of the respectively executed map jobs, a plurality of intermediate output elements, each said intermediate output element including a key-value pair, where each of the respectively executed map jobs is identified by a corresponding map task identifier and each intermediate output element includes substantive data generated as a result of executing the map job using the input data;

writing, for each one of the generated plurality of intermediate output elements, the corresponding intermediate output element as the value of a corresponding in-memory key-value pair that is stored in the volatile storage of the distributed network system, where the key for the corresponding in-memory key-value pair is based on a combination of a map task identifier for the map job that generated the corresponding intermediate output element and a reduce task identifier for a reduce job; and wherein a plurality of reduce jobs of the map reduce sequence are configured to execute on multiple ones of the plurality of computer nodes, the execution of each of the plurality of reduce jobs configured to, upon receipt of electronic instructions:

for each reduce job, retrieve, from the volatile storage of the distributed network system, values of multiple corresponding in-memory key-value pairs that have keys that are based at least in part on a reduce task identifier assigned to the corresponding reduce job, execute the corresponding reduce job, using at least one processor of the respective computer node, using the intermediate output elements that are included in the respective values of the multiple corresponding in-memory key-value pairs, and output a result from the reduce job for the map reduce sequence.

2. The method of claim 1, wherein the substantive data of each intermediate output element is organized in key-value form.

3. The method of claim 1, wherein volatile memory of each one of the plurality of computer nodes is part of an in-memory data grid (IMDG), and the volatile memory of each one of the plurality of computer nodes is controlled by an IMDG client.

4. The method of claim 3, further comprising replicating at least some of the in-memory key-value pairs that are stored in the volatile storage of the distributed network system to an in-memory data grid (IMDG) server of the distributed network system.

5. The method of claim 4, wherein, for in-memory key-value pairs that are inaccessible on a given computer node, retrieving values of corresponding in-memory key-value pairs from the IMDG server.

6. The method of claim 1, wherein the map task identifiers and reduce task identifiers are serialized.

7. The method of claim 1, further comprising:
holding the intermediate output elements in volatile memory of the computer node that executed the corresponding map job; and
preventing intermediate output elements from spilling to non-volatile memory of the distributed network system.

8. The method of claim 7, wherein the volatile memory is off-heap memory.

9. The method of claim 1, wherein the reduce jobs are configured to execute once all intermediate output elements have been retrieved.

10. The method of claim 1, wherein the reducer jobs are configured to execute once intermediate output elements have been retrieved and sorted.

11. The method of claim 10, wherein the output element values are sortable via a merge sort.

12. The method of claim 1, wherein shuffle and sort map reduce operations are performed on computer nodes that perform the reducer job.

13. A method of performing a map reduce sequence in connection with a plurality of computer nodes in a distributed network system, each of the plurality of computer nodes including at least one hardware processor, the distributed network system including volatile storage, the method comprising:

executing, on multiple ones of the plurality of computer nodes, a map job, as part of the map reduce sequence, by using input data to generate, from each of the respectively executed map jobs, a plurality of intermediate output elements, each said intermediate output element including a key-value pair, where each of the respectively executed map jobs is identified by a corresponding map task identifier and each intermediate output element includes substantive data generated as a result of executing the map job using the input data, wherein the substantive data of each intermediate output element is organized in key-value form;

writing, for each one of the generated plurality of intermediate output elements, the corresponding intermediate output element as the value of a corresponding in-memory key-value pair that is stored in the volatile storage of the distributed network system, where the key for the corresponding in-memory key-value pair is based on a combination of a map task identifier for the map job that generated the corresponding intermediate output element and a reduce task identifier for a reduce job;

holding the intermediate output elements in volatile memory of the respective one of the plurality of computer nodes; and preventing the intermediate output elements from spilling to the non-volatile memory of the respective one of the plurality of computer nodes.

14. The method of claim 13, wherein key objects are serializable.

15. A non-transitory computer readable storage medium tangibly storing instructions that, when executed, perform the method of claim 13.

16. A method of performing a map reduce sequence in connection with a plurality of computer nodes in a distributed network system, each of the plurality of computer nodes including at least one hardware processor, the distributed network system including volatile storage, the method comprising:

executing, on multiple ones of the plurality of computer nodes, reduce jobs of the map reduce sequence;

for each reduce job that is executing on a corresponding one of the plurality of computer nodes, retrieving, from the volatile storage of a given one of the plurality of computer nodes, at least intermediate output element values based on map task and reduce task identifiers specified by electronic instructions received at the respective plurality of computer nodes, the intermediate output element values being values of a corresponding in-memory key-value pair stored in the volatile storage of the distributed network system, where the key for the corresponding in-memory key-value pair is based on a combination of a map task identifier for the map job that generated the corresponding intermediate output element and a reduce task identifier for a reduce job;

storing the retrieved intermediate output element values to the volatile storage of the respective plurality of computer nodes;

ordering the retrieved intermediate output element values;

wherein execution of the reduce job uses the retrieved and ordered intermediate output element values; and outputting a result from the reduce job for the map reduce sequence, wherein each said intermediate output element includes a first key-value pair, each intermediate output element key includes an associated map task identifier and an associated reduce task identifier, and each intermediate output element value includes substantive data that is generated by a map reduce function and organized as a second key-value pair.

17. A non-transitory computer readable storage medium tangibly storing instructions that, when executed, perform the method of claim 16.

18. A computer system configured to perform a map reduce sequence, comprising:

a plurality of computer nodes, each of the plurality of computer nodes including at least one processor and volatile memory;

wherein at least a first group of the plurality of computer nodes are configured to:

execute, using the at least one processor of a respective mapper node, a map job, as part of the map reduce sequence, by using input data to generate, from each of the respectively executed map jobs, a plurality of intermediate output elements, each said intermediate output element including a key-value pair, where each of the respectively executed map jobs is identified by a corresponding map task identifier and each intermediate output element includes substantive data generated as a result of executing the map job using the input data, and writing, for each one of the generated plurality of intermediate output elements, the corresponding intermediate output element as the value of a corresponding in-memory key-value pair that is stored in the volatile storage of the distributed network system, where the key for the corresponding in-memory key-value pair is based on a combination of a map task identifier for the map job that generated the corresponding intermediate output element and a reduce task identifier for a reduce job; and wherein at least a second group of the plurality of computer nodes are configured to, upon receipt of electronic instructions:

for each reduce job, retrieve from the volatile storage of the distributed network system, values of multiple corresponding in-memory key-value pairs that have keys that are based at least in part on a reduce task identifier assigned to the corresponding reduce job, store the retrieved intermediate output element values to the volatile storage of the respective computer node, execute the corresponding reduce job, using the at least one processor of the respective computer node, using the retrieved intermediate outputs that are included in the respective values of the multiple corresponding in-memory key-value pairs, and output a result from the reduce job for the map reduce sequence.

19. The system of claim 18, wherein the substantive data of each intermediate output element is organized in key-value form.

20. The system of claim 19, wherein key objects are serializable.

21. The system of claim 18, wherein volatile memory of each one of the plurality of computer nodes is part of an in-memory data grid (IMDG), and the volatile memory of each one of the plurality of computer nodes is controlled by an IMDG client.

22. The system of claim 21, wherein:

each said node is further configured to replicate intermediate output elements to an in-memory data grid (IMDG) server; and the nodes are further configured to retrieve intermediate output element values from the IMDG server in response to the given node from which the intermediate output element values are to be retrieved being inaccessible.

23. The system of claim 18, wherein the mapper nodes are further configured to:

hold the intermediate output elements in volatile memory of the computer node that executed the corresponding map job; and prevent the intermediate output elements from spilling to non-volatile memory.

24. The system of claim 23, wherein the volatile memory is direct off-heap memory.

25. The system of claim 18, wherein the reduce jobs are configured to execute once all intermediate output elements have been retrieved.

* * * * *